United States Patent
Labrozzi et al.

(10) Patent No.: US 9,661,045 B2
(45) Date of Patent: May 23, 2017

(54) SYSTEM AND METHODS FOR DYNAMIC TRANSCODER RATE ADAPTION FOR ADAPTIVE BIT RATE STREAMING

(71) Applicant: Cisco Technology, Inc., San Jose, CA (US)

(72) Inventors: Scott Christopher Labrozzi, Cary, NC (US); Warren Scott Wainner, Sterling, VA (US)

(73) Assignee: Cisco Technology, Inc., San Jose, CA (US)

( * ) Notice: Subject to any disclaimer, the term of this patent is extended or adjusted under 35 U.S.C. 154(b) by 235 days.

(21) Appl. No.: 14/154,144

(22) Filed: Jan. 13, 2014

(65) Prior Publication Data

US 2015/0200987 A1    Jul. 16, 2015

(51) Int. Cl.
| | | |
|---|---|---|
| G06F 15/16 | (2006.01) | |
| H04L 29/06 | (2006.01) | |
| H04N 21/4402 | (2011.01) | |
| H04N 21/462 | (2011.01) | |
| H04N 21/63 | (2011.01) | |
| H04N 21/84 | (2011.01) | |

(52) U.S. Cl.
CPC ...... *H04L 65/4092* (2013.01); *H04L 65/1023* (2013.01); *H04L 65/4084* (2013.01); *H04L 65/602* (2013.01); *H04N 21/44029* (2013.01); *H04N 21/4621* (2013.01); *H04N 21/632* (2013.01); *H04N 21/84* (2013.01); *H04L 29/06* (2013.01)

(58) Field of Classification Search
CPC ...................................................... H04L 29/06
USPC ................................................. 709/231–233
See application file for complete search history.

(56) References Cited

U.S. PATENT DOCUMENTS

| | | | |
|---|---|---|---|
| 2008/0072264 A1* | 3/2008 | Crayford ........... | H04L 29/06027 725/86 |
| 2011/0082924 A1* | 4/2011 | Gopalakrishnan .. | H04L 65/4084 709/223 |
| 2012/0216038 A1 | 8/2012 | Chen et al. | |

(Continued)

FOREIGN PATENT DOCUMENTS

| | | |
|---|---|---|
| EP | 2661045 | 11/2013 |
| WO | 2012/142510 | 10/2012 |

OTHER PUBLICATIONS

International Search Report and Written Opinion, dated Mar. 30, 2015, received in connection with International Application No. PCT/US2015/011162.

*Primary Examiner* — Hieu Hoang (74) *Attorney, Agent, or Firm* — Meunier Carlin & Curfman LLC (57) ABSTRACT

A system and methods for providing dynamic transcoder rate adaption for an adaptive bit streaming function is described. In a first embodiment, a client may select from all available bit rates during the encoding session, wherein the bit rates are provided to the client via a manifest file from a media gateway. In a second embodiment, a subset of the bit rates are provided to the client, from which a client chooses a selected bit rate. The encoding session continues until a request for a new bit rate is received from the client, at which time a new subset of bit rates are generated. This new subset of bit rates is presented to the client, and this loop continues until the termination of the encoding session.

20 Claims, 9 Drawing Sheets

(56) References Cited

U.S. PATENT DOCUMENTS

| | | | |
|---|---|---|---|
| 2013/0080579 A1* | 3/2013 | Gordon | H04L 65/608 709/217 |
| 2013/0080772 A1* | 3/2013 | McGowan | H04L 63/0428 713/165 |
| 2013/0091249 A1* | 4/2013 | McHugh | H04N 21/23439 709/219 |
| 2013/0198335 A1* | 8/2013 | Goel | H04N 21/23433 709/219 |
| 2013/0286879 A1* | 10/2013 | Elarabawy | H04N 21/26208 370/252 |
| 2014/0074961 A1* | 3/2014 | Liu | H04L 67/1095 709/213 |
| 2014/0189141 A1* | 7/2014 | Kim | H04L 65/602 709/231 |
| 2014/0310424 A1* | 10/2014 | Andersson | H04L 65/4084 709/231 |
| 2015/0127848 A1* | 5/2015 | Houdaille | H04L 65/4084 709/233 |

* cited by examiner

```
#EXTM3U
#EXT-X-STREAM-INF:PROGRAM-ID=1,BANDWIDTH=256000 http://example.com/common.m3u8
#EXT-X-STREAM-INF:PROGRAM-ID=1,BANDWIDTH=512000 http://example.com/common.m3u8
#EXT-X-STREAM-INF:PROGRAM-ID=1,BANDWIDTH=1000000 http://example.com/common.m3u8
```

*FIG.5A*

```
http: example.com common.m3u8

#EXTM3U
#EXT-X-VERSION:3
#EXT-X-TARGETDURATION:8
#EXT-X-MEDIA-SEQUENCE:2680
#EXTINF:7.975,
https://priv.example.com/common/fileSequence2680.ts
#EXTINF:7.941,
https://priv.example.com/common/fileSequence2681.ts
#EXTINF:7.975,
https://priv.example.com/common/fileSequence2682.ts
```

SYSTEM AND METHODS FOR DYNAMIC TRANSCODER RATE ADAPTION FOR ADAPTIVE BIT RATE STREAMING

BACKGROUND

For many years, people have become increasingly dependent on their mobile devices. In parallel, people are also accessing a growing number and types of media on the internet. Today's streaming technologies for media sources provide multiple ABR streaming bit rates, and a priori, select the bit rates for encoding the media sources. However, challenges occur when providing the same streaming access to these media sources to mobile devices, as mobile devices and other residential networks typically do not have the same transcoder resources as more complex network media gateways. Therefore, there is a need in the art for a method and system for efficiently and effectively providing access to streaming media in a network or device with limited transcoder resources.

SUMMARY

Broadly described, the various embodiments of the invention provide a method and system for providing dynamic transcoder rate adaption for an adaptive bit streaming function. In a first embodiment, the client may select from all available bit rates during the encoding session, wherein the bit rates are provided to the client via a manifest file. In a second embodiment, a subset of the bit rates are provided to the client, from which a client chooses a selected bit rate. The encoding session continues until a request for a new bit rate is received from the client, at which time a new subset of bit rates are generated. This new subset of bit rates is presented to the client, and this loop continues until the termination of the encoding session.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF DRAWINGS

Like reference numbers and designations in the various drawings indicate like elements.

DETAILED DESCRIPTION

Figure 1:
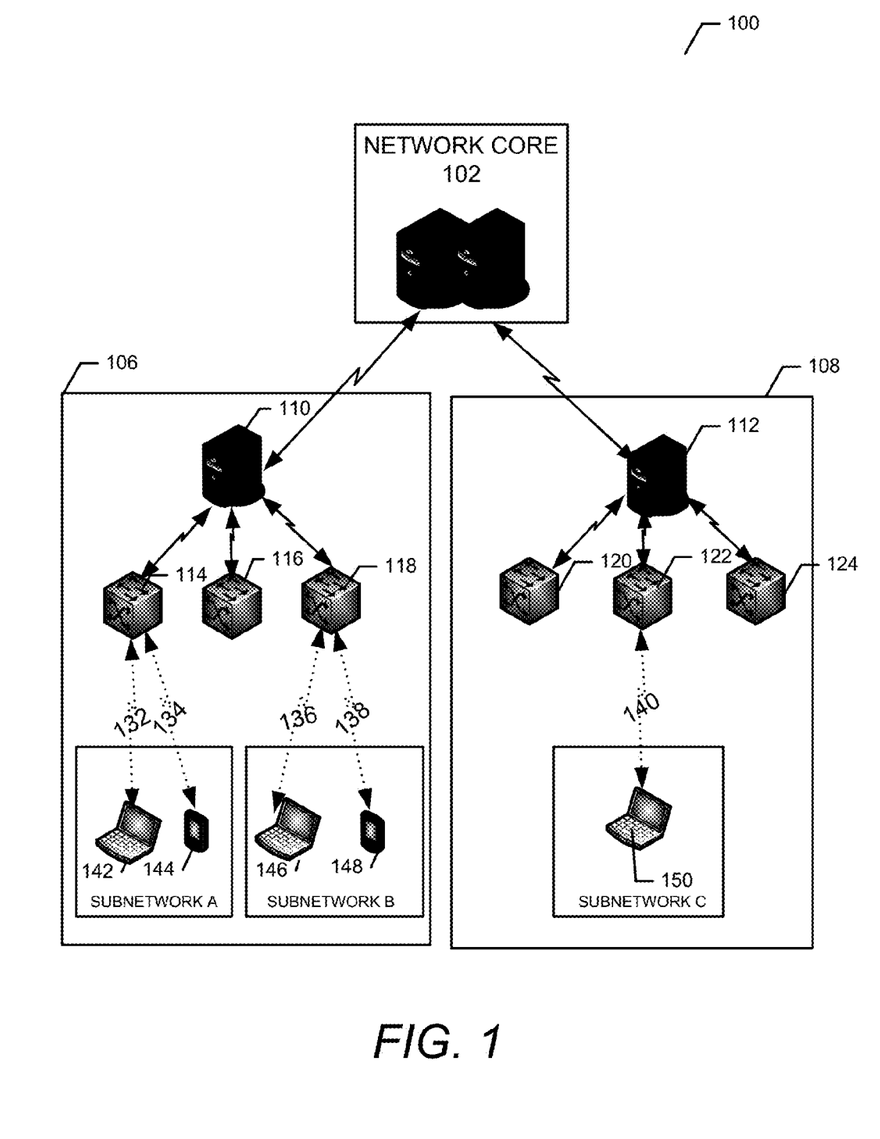
FIG. 1 is a block diagram of an example environment for providing dynamic transcoder rate adaption in accordance with the various embodiments of the present invention.

FIG. 1 is a block diagram of a system according to the various embodiments of the invention. Network 100 comprises a network core 102, which may include one or more servers capable of storing various types of media, and also, servers for serving as the backbone for network 100. Related to the backbone function, network core 102 comprises equipment to provide paths for the exchange of information, such as media, between a plurality of distributed networks (106 and 108). Each distributed network includes a distributed network server (110 and 112, respectively), which is coupled to one or more routers (114-124). Those skilled in the art will appreciate that various types and quantities of equipment and structure may be included in the network core and each distributed network within the spirit and scope of this invention.

System 100 further includes one or more clients 142-150, wherein each client 142-150 is communicatively coupled to a router 114-124 (depending on the router servicing the subnetwork wherein the client is located). Each router 114-124 may comprise a media gateway 208, as will be described further in FIG. 2. The connection between the router 114-124 and a client 142-150 may comprise, without limitation, a WIFI connection, Ethernet connection, or Apple Bonjour connection. This connection, referred to herein as simply a "connection", is shown as 132-140 in FIG. 1. Clients 142-150 in system 100 may utilize one or more applications, such as a Facebook application, Microsoft Word application, or Firefox application which may generate a plurality of media or packets, including videos, pictures, or a live video feed (hereinafter referred to as "media").

Figure 2:
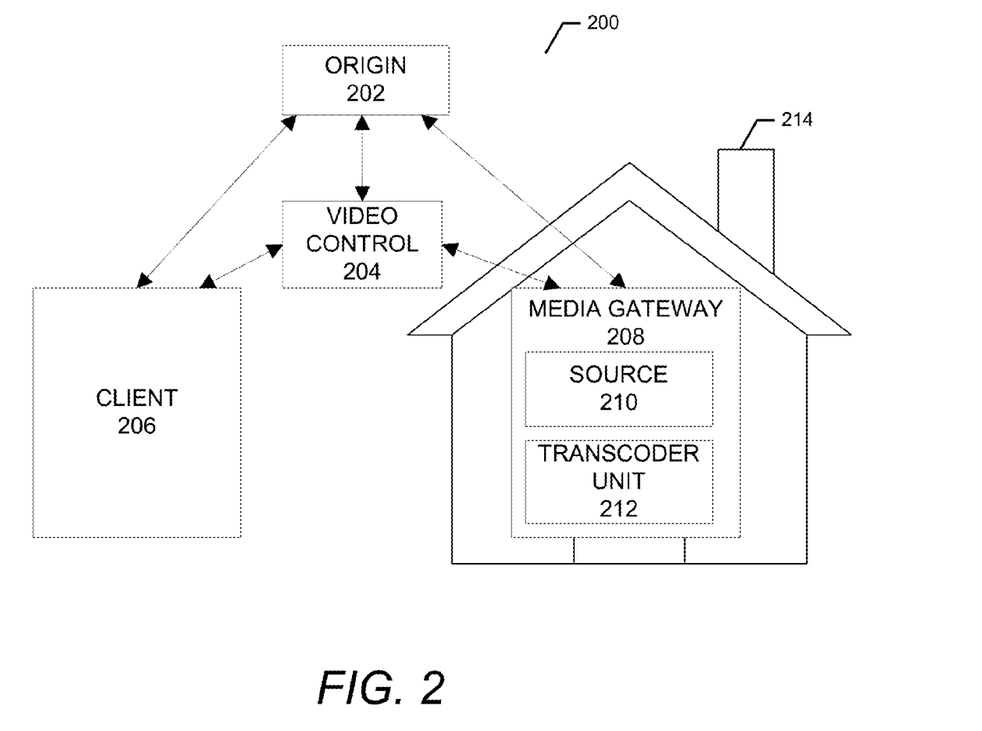
FIG. 2 is a block diagram of a system in accordance with the first embodiment of the invention.

FIG. 2 is a block diagram of a system 200 in accordance with the first embodiment of the invention. As shown in FIG. 2, a network located at a residence 214 (hereinafter referred to as a "home network") may be utilized, but those skilled in the art will appreciate that any type of smaller network or subnetwork may be utilized in the same capacity as the home network 214 within the spirit and scope of the present invention. Further, the embodiments of the invention described herein may be applied higher in a network environment than a home network 200 within the spirit and scope of the invention.

Origin server 202 comprises any source capable of storing and serving media, such a virtual or physical server located within the network core 102 of network 100. Alternatively, origin server 202 may be a distributed network server (such as 110 and 112 in FIG. 1). Origin server 202 may comprise a single server, or may comprise functionality spread among multiple network devices or components in network 100. Origin server 202 is coupled via a communication path, such as a wireless or wired connection, to media gateway 208 and video control 204. Those skilled in the art will recognize that origin server 202 may comprise a multitude of forms or configurations within the spirit and scope of the invention.

Video control 204 may be a stand-alone server, a virtual or physical server within network core 102, or a functioning entity within another network device (such as distributed network servers 110 and 112). Video control 204 serves as the rendezvous point between a client 206, home network 214 and the origin 202, and as such, coordinates the location of media on the origin server 202 when a client 206 media request for selected media is requested from home network 214. On the other hand, video control 204 also receives the delivery service parameters for the selected media, including without limitation, the publication URL for the media gateway 208 or the manifest URL for the client 206.

The media gateway 208 is communicatively coupled via a communication path, or located within, home network 214, and comprises a source 210 and at least one transcoder in transcoder unit 212. While only one transcoder is illustrated in FIG. 2, those skilled in the art will appreciate that more than one transcoder may be included within the spirit and scope of the present invention. As will be discussed in greater detail in the figures that follow, the media gateway 208 creates one or more encapsulated streams of media as well as a manifest file as described in FIGS. 5A and 5B. The media gateway 208 posts the manifest file, media playlists, and single stream of segments to origin server 202. The media gateway 208 also notifies video control 204 of the availability of the requested stream.

In first alternate embodiment, an intermediary device (a "video relay device") may exist between the media gateway 208 and video control 204. In this alternate embodiment, the video relay device may receive or transmit service, setup, and origin messages to video control 204. In a second alternate embodiment, a location server may exist between the client 206 and video control 204, wherein the location server will transmit and receive location information between video control 204 and the client 206.

Figure 9:
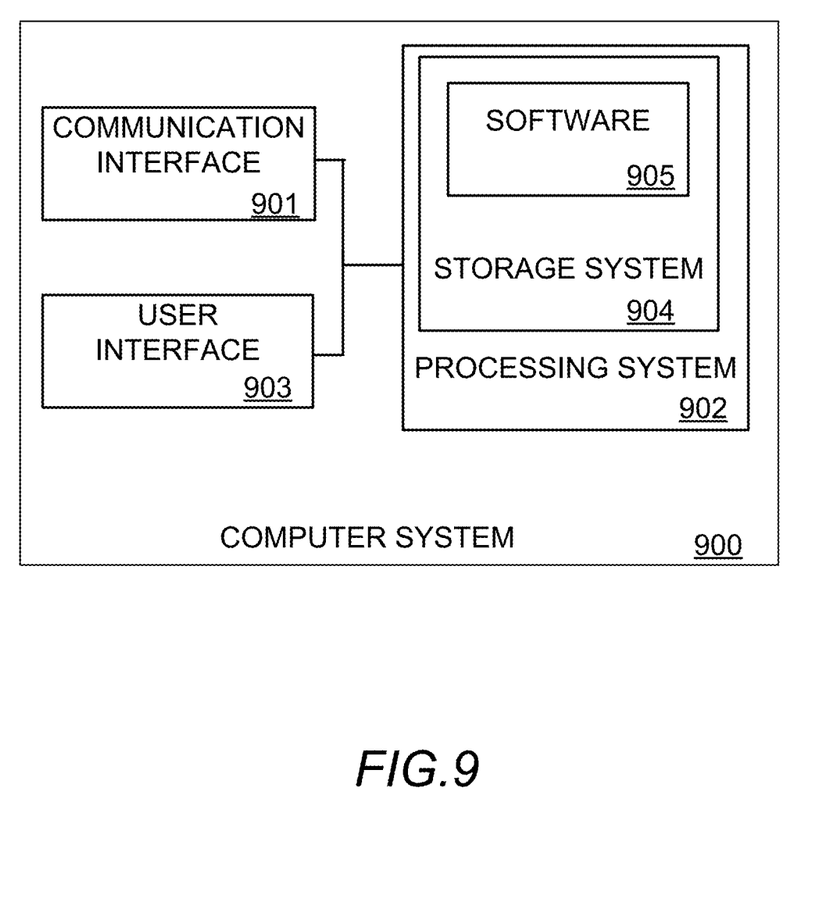
FIG. 9 is a block diagram illustrating a network device in accordance with the various embodiments of the invention.

The client 206 may comprise any type of end user device (such as 142-150 in FIG. 1) that is communicatively coupled to origin 202. For example and not limitation, the client may comprise a smartphone, tablet computer, wearable communication device, or laptop. The connection between the client 206 and origin 202 may comprise a wireless connection via a telecommunications network. In an embodiment wherein video control 204 is physically located within the origin 202, the connection between the client 206 and video control 204 may comprise the same connection between the client 206 and origin 202. The client may comprise a structure as depicted in FIG. 9, as will be described later in this application.

Figure 3:
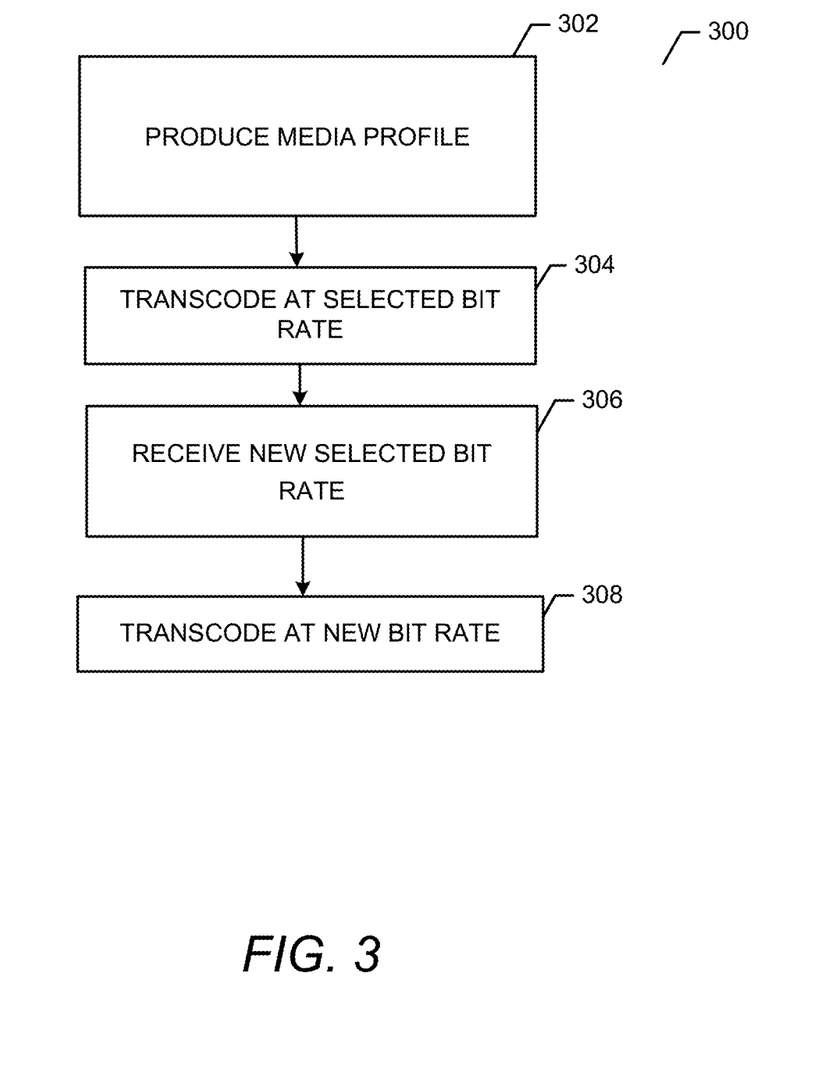
FIG. 3 is a flow diagram illustrating the method of the first embodiment of the invention.

FIG. 3 is a flow diagram illustrating the method of the first embodiment of the invention. Method 300 begins with the production of a media profile at step 302. As will be described further in FIGS. 5A and 5B, the transcoder 212 produces a single media profile which is referenced by the all of the of the available bit rates ("bit rate variants") in the manifest file. As a result, a single media stream is represented at different bit rates while only a single bit rate is produced by the transcoder.

As step 304, the transcoder 212 adapts to a selected bit rate received from the client 206. Instead of establishing the bit rate for the client a priori, the transcoder 212 follows the lead of the client 206 to adapt the transcoder 212 to the bit rate requested by the client. As such, the transcoder 212 continues to transcode at the bit rate received from the client 206 at step 304. At step 306, the client 206 sends a request for a new bit rate to video control 204, and switches to the new bit rate at step 308. This new bit rate may be higher or lower than the bit rate received from the client 206 at step 304. In parallel, video control 204 sends a request to transcoder 212 to begin transcoding at the new bit rate. To optimize the streaming experience and provide a seamless transition to the new bit rate, the client 206 may employ dampening to its switching algorithm to account for any lag time resulting from the time difference between switching up, or down, to the new bit rate, and the new bit rate becoming available.

Figure 4:
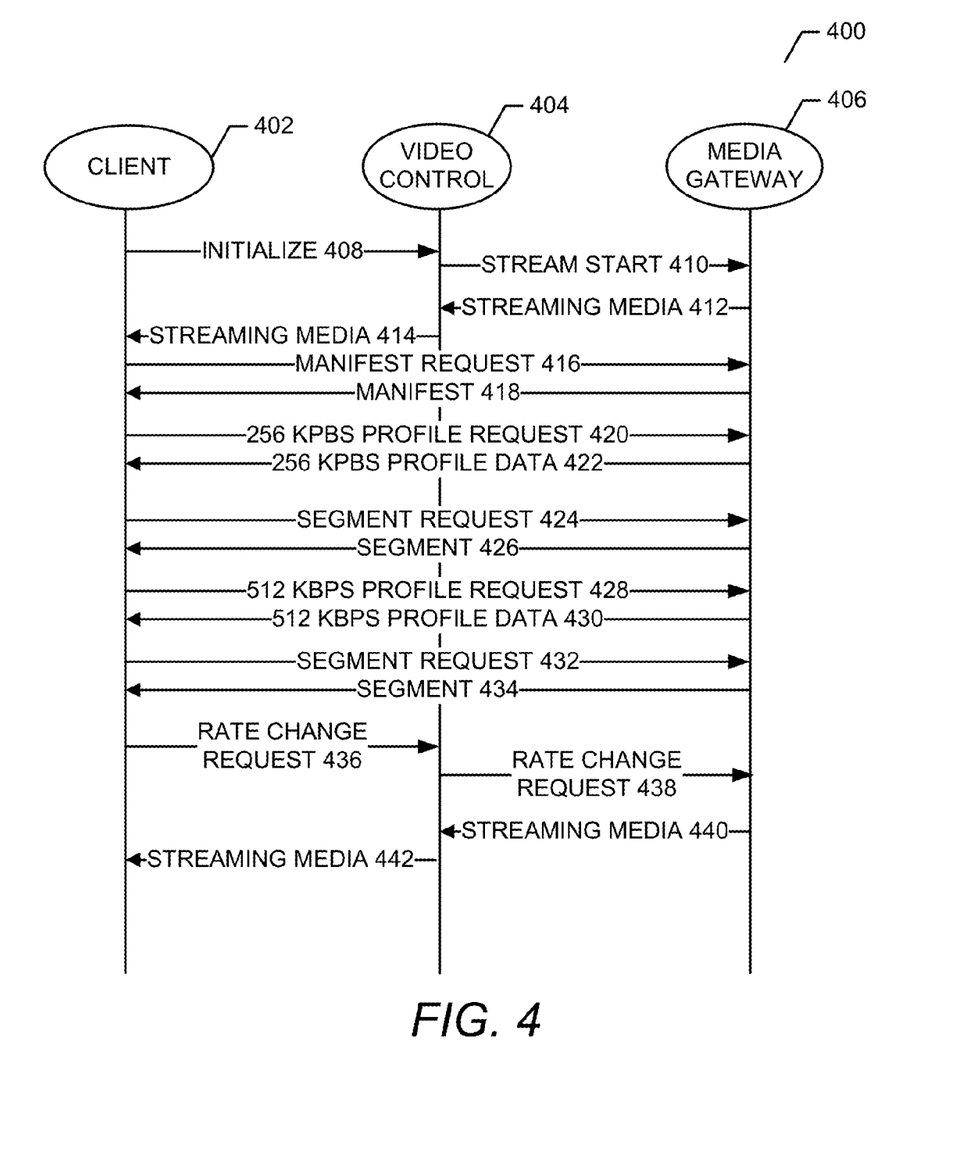
FIG. 4 is a signaling diagram illustrating the method of the first embodiment of the invention.

FIG. 4 is a signaling diagram illustrating an exemplary exchange of signals between client 402, video control 404, and media gateway 406 in the first embodiment of the invention. The exchange of signals in signaling diagram 400 is not meant to be limiting, but rather, illustrate one example of signals which may occur in the first embodiment of the invention. In signaling diagram 400, client 402 sends an initialize signal 408 to video control 404. Video control 404 in turn sends a stream start signal 410 to media gateway 406, which returns a streaming media signal 412 to video control 404. A streaming media signal is then forwarded to client 402 from media control 404.

Client 402 sends a manifest request 416 to the media gateway 406, which responds with a signal 418 including the manifest. For exemplary purposes only in this signaling diagram 400, the client 402 selects the 256 KBPS rate via signal 420. Media gateway 406 responds with a signal 422 including the 256 KPBS profile data, and the client 402 requests the first segment via request 424 to begin transcoding at 256 KPBS. The media gateway 406 also responds by providing the first segment via signal 426.

For each change in profile requested by the client 402, the client 402 must also notify the video control 404 of the rate change. The video control 404 relays the rate change request to the media gateway 406, at which time the media gateway 406 start encoding the stream at the new bit rate. At stream initialization, the client 402 may request the segment only after the segment has been produced by the media gateway, and therefore, the rate change request must have propagated via the video control 404 to the media gateway 406 first.

After initialization, the rate change request can be relayed via the control point while the client 402 continues to request media segments encoded with the old rate. After the rate change request propagates through the video control 404 to the media gateway 406, the media gateway 406 will start producing segments at the new bit rate. The client 402 will now receive the rate adapted segments.

Client 402 then determines that a higher bit rate can be accommodated, and sends a signal 428 to the media gateway 406 for the profile data for 512 KPBS. To arrive at this determination, the client 402 may employ any number of methods. For example and without limitation, the client 402 may conclude that the decoding buffer is always full, and therefore, if data is arriving quickly, a higher bit rate should be utilized. By analyzing the fullness, or emptiness, of the decoding buffer, client 402 can determine if a higher or lower bit rate should be utilized. The goal is for the media gateway produce a media stream that has a high probability of successful delivery without having to produce all the streams simultaneously (the media gateway can't produce all the streams). The media gateway 406 responds by sending a signal 430 including the 512 KPBS profile data, and client 402 follows with a signal requesting a first segment 432. A rate change request 436 is sent from the client 402 to video control 404, which in turn sends a rate change request 438 to the media gateway 406. The media gateway 406 responds with streaming media signal 440, which is sent to video control 404, then forwarded to client 402 as streaming media signal 442.

Figure 5A:
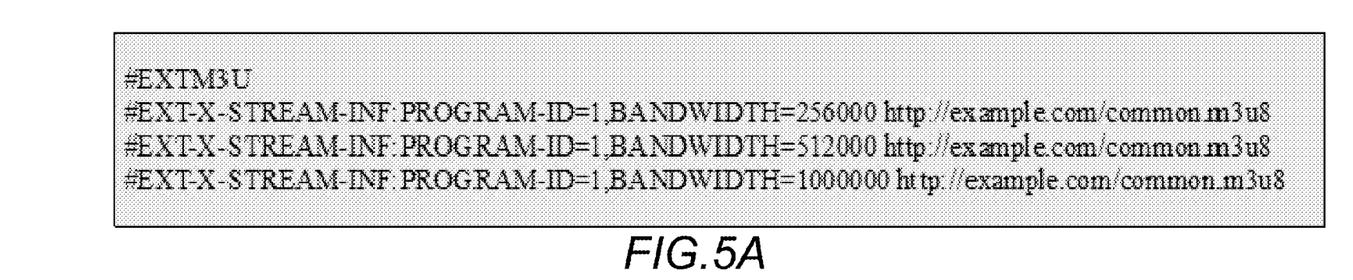
FIGS. 5A and 5B are exemplary code sections illustrating the first embodiment of the invention.
Figure 5B:
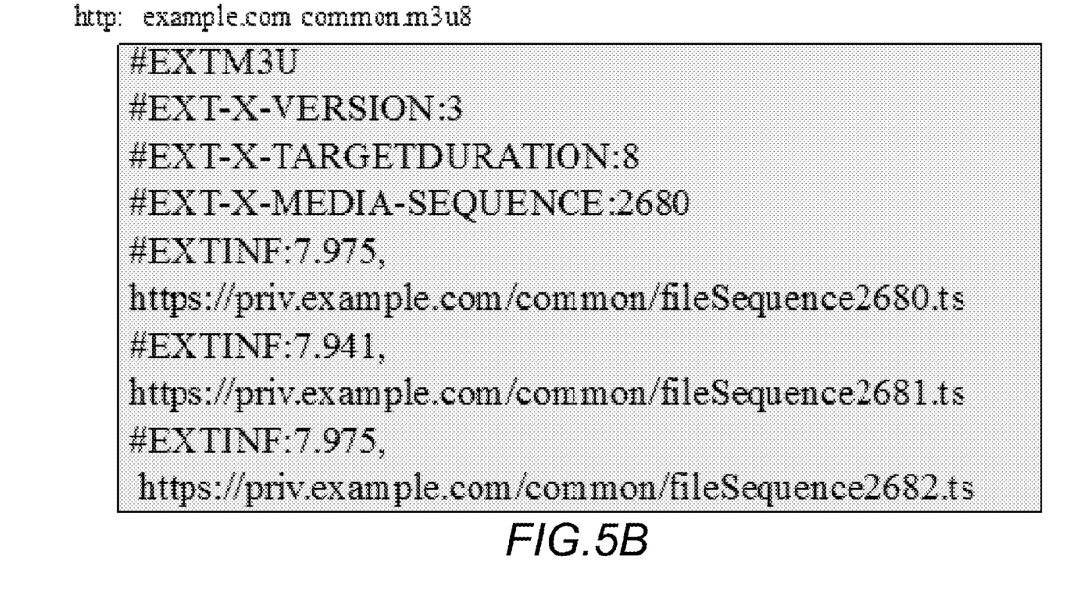

FIGS. 5A and 5B are exemplary code sections illustrating the manifest files involved in the first embodiment of the invention. FIG. 5A is a manifest file, also referred to as a media playlist, which contains references to the same media profile. As shown in the first, second, and third lines of code, the same media profile of http://example.com/common.m3u8 is provided for each bandwidth level of 256 KBPS, 512 KPBS, and 1000 KPBS. FIG. 5B illustrates a common media playlist which depicts that the same segments are delivered for each bit rate. By providing the same media profile for each bit rate, a single media stream can be represented at different bit rates, while only a single bit rate is produced.

Figure 6:
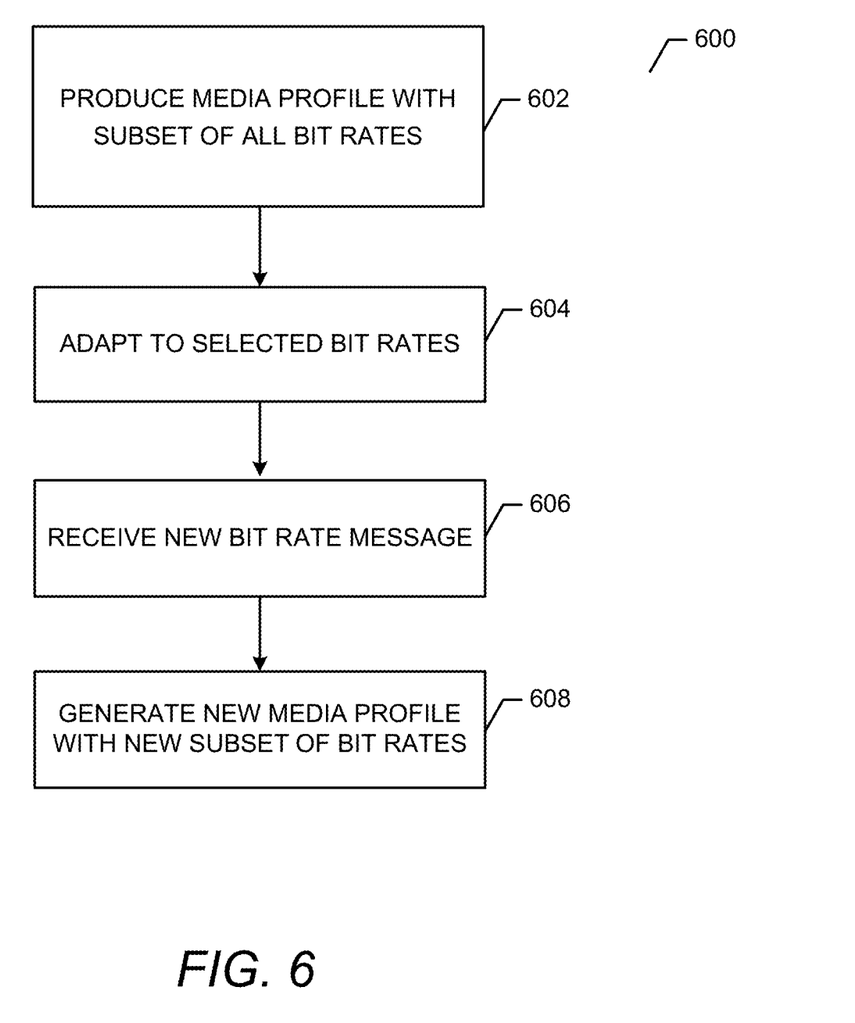
FIG. 6 is a flow diagram illustrating the second embodiment of the invention.

FIG. 6 is a flow diagram illustrating the second embodiment of the invention. In this embodiment, the goal is to for the transcoder to 'anticipate' the profiles that the client may request. The likely candidates are those profiles adjacent to the profile bit rate that the client is currently consuming.

Method 600 begins with the production of a media profile that includes a subset of all bit rate variants at step 602. In contrast with the first embodiment, in which all available bit rates are presented as options but only one bit rate is produced, in this second embodiment, a subset of available bit rates are presented as options. The particular subset of available bit rates that are presented follow the following subset generating algorithm: 1) When at the lowest bit rate, only the lowest bit rate and the next highest bit rate are advertised as options via the manifest file; 2) When at the highest bit rate, only the highest bit rate and the next lowest bit rate are advertised; and 3) in any other situation, the bit rate being generated and the bit rates on either side of this rate are advertised.

At step 604, method 600 adapts to the selected bit rates. This step 604 comprises the video control 204 sending a signal to transcoder 212 to transcode at the selected bit rate. At step 606, method 600 receives a new bit rate message. This new bit rate message originates from the client 206, and is sent via the video control 204. At step 608, method 600 generates a new manifest with a new subset of profiles representing the new range of bit rates. The new subset of bitrates is generated by applying the subset generating algorithm to the selected bit rate of step 604. Step 608 may be performed by the media gateway 208 while the video control 204 relays the availability of the new manifest to the client 206.

Figure 7:
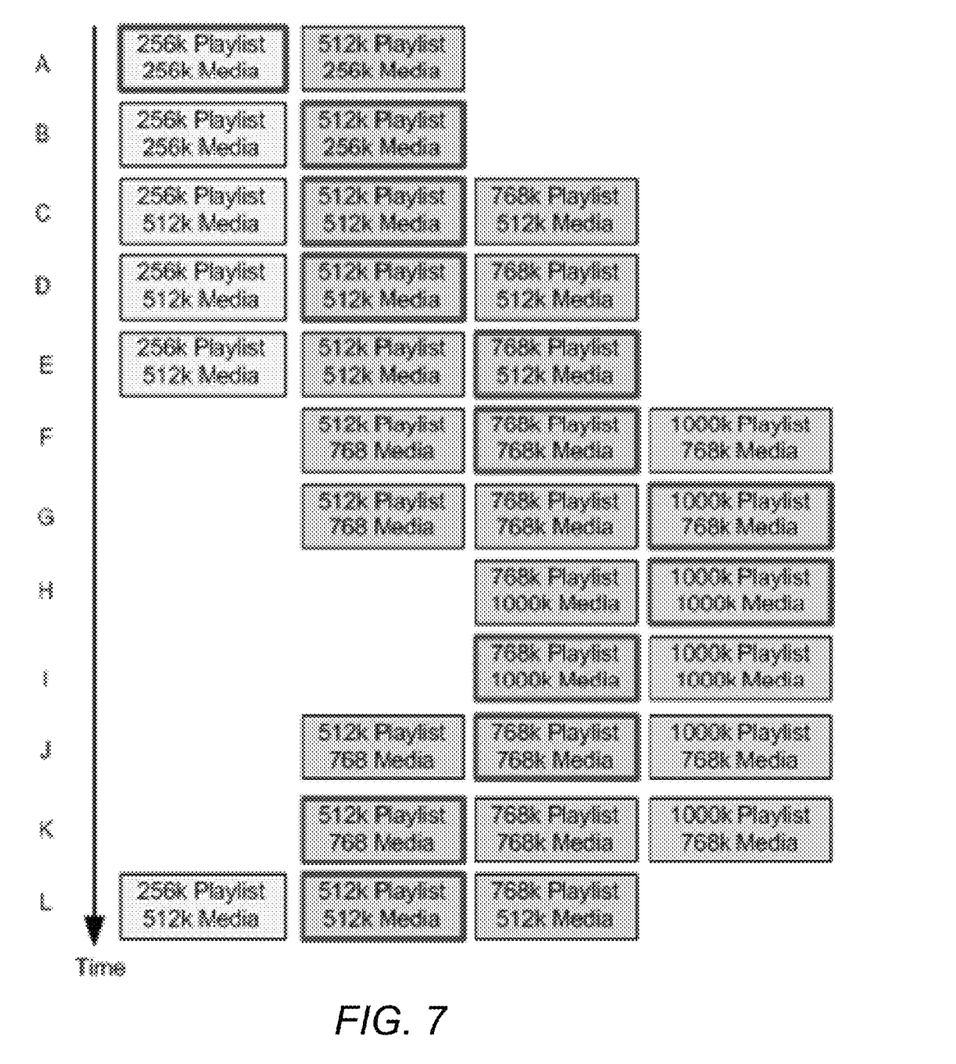
FIGS. 7 and 8 are block diagrams illustrating the second embodiment of the invention.

Notably, method 600 does not involve dampening as present in method 300 of the first embodiment. No dampening is needed in the second embodiment because the dampening is regulated by the advertised bit rates in the manifest file. FIG. 7 illustrates an example, which includes the advertised bit rates (in boxes to the right) for each time (A-L) along the vertical time axis. At time A, two bitrates are advertised to the client, 256 KPBS and 512 KPBS, as shown in the leftmost box. The rightmost box at time A illustrates the bit rate representing the media segments at that time. For example, at time A, the media segments for the 256 KPBS and 512 KPBS playlist are actually 256 KPBS bit rate segments. The boxes with bolded frames indicates which bit rate is currently being consumed by the client.

Initially, at time A, only the lowest bit rate is being produced and two bitrates are advertised, the lowest 256 KPBS and the next highest bit rate, 512 KPBS. At time B, the client determines that an increase in bit rate consumption is needed, or possible, and thus switches to the higher bit rate. However, at time B, the media within this playlist is still being transcoded at the lower bit rate. As in the first embodiment, the client sends a signal to request an upshift which propagates to the transcoder 212.

Once the transcoder 212 begins to produce the upshifted bit rate at time C, the transcoder advertises that a subset of three bit rates are available. These available bit rates include the current bit rate and the bitrates just below and just above the current bit rate. The advertising of new rates could be accomplished in various ways. For example, in Dynamic Adaptive Streaming over HTTP (DASH), this would be via ending the current period and creating a new period with a new set of adaptation sets. In other formats, either in-band or out-of-band metadata could be used to inform the client of the new rates. At this point, the client is now consuming the new desired bit rate, 512 KPBS, in this example, and is aware of two other possible rates.

The client 206 continues with the 512 KBPS rate until time E, at which point the client 206 upshifts again and now consumes the 768 KBPS playlist (but only 512 KPBS media). This consumption of the 768 KPBS playlist continues until time F when the transcoder has started to actually produce 768 KPBS media. At time F, out of the four potential rates, the top rate of 1000 k is now advertised.

At time G, the client again decides to upshift and the logic described above repeats except for the fact that the highest bit rate has been reached. Therefore, once the encoder produces this 1000 KPBS rate at time H, only this highest rate (1000 KPBS) and the one below the highest rate (768 KPBS) are advertised. At time I, the client decides to downshift. While the client begins to consume the 768 KPBS playlist However, because there is not a lower bit rate available for downshifting purposes, the client 206 will remain at the lowest advertised bit-rate rate (768 KBPS), even though the transcoder is capable of producing lower bit rates (256 KBPS and 512 KBPS).

At time J, the transcoder has adjusted to the lower 768 KPBS rate, and now 768 KPBS, the next highest rate of 1000 KPBS, and the next lowest rate of 512 KPBS are advertised for future consumption. Optionally, not shown, when downshifting such as point J, the transcoder could delay the advertisement of the lowest rate.

Figure 8:
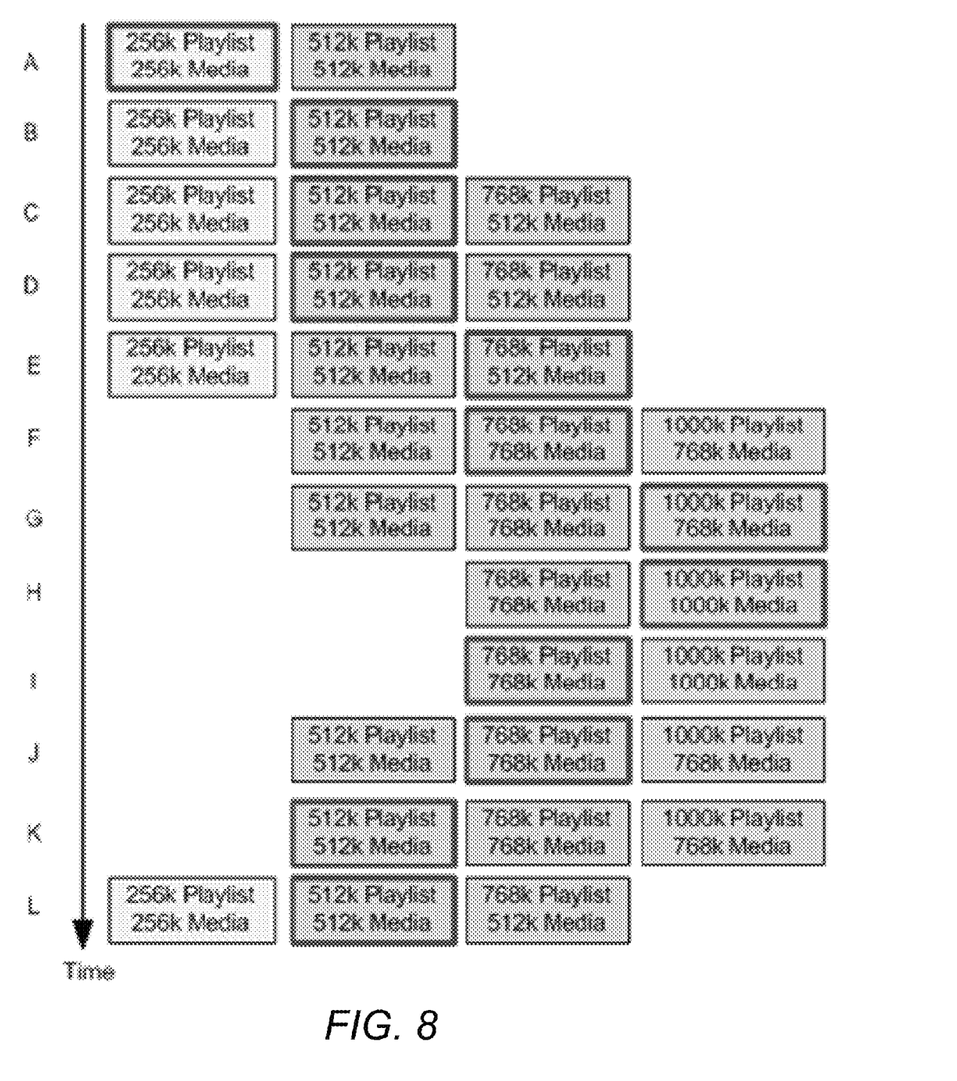

The examples herein described use cases where only a single transcoder resource was available for contributing to the ABR experience. However, the embodiments support when more transcoders were available, but still less than the required number for the ABR bit rate spectrum. For example, if two transcoder resources were available, then the current and next lowest bit rate could be produced as shown in FIG. 8. When the current bit rate is the lowest, then the lowest and next highest bit rate is produced. Thus, as shown in FIG. 8, this alternative embodiment addresses the buffering issue with downshifting.

FIG. 9 is a block diagram illustrating a network device in accordance with the various embodiments of the invention. This network device 900 may include, without limitation, a client such as 128-130, 142-144 or 146 in FIG. 1. Network device 900 includes communication interface 901, processing system 902, and user interface 903. Processing system 902 includes storage system 904. Storage system 904 stores software 905, which may include without limitation, software configured to perform the methods described herein. Processing system 902 is linked to communication interface 901 and user interface 903, and may be configured to execute any of the methods described herein. In addition to a client, network device 900 could include a programmed general-purpose computer, although those skilled in the art will appreciate that programmable or special purpose circuitry and equipment may be used. Network device 900 may be distributed among multiple devices that together make up elements 901-905.

Communication interface 901 could include a network interface, modem, port, transceiver, or some other communication device. Communication interface 901 may be distributed among multiple communication devices. Processing system 902 could include a computer microprocessor, logic circuit, or some other processing device. Processing system 902 may be distributed among multiple processing devices. User interface 903 could include a keyboard, mouse, voice recognition interface, microphone and speakers, graphical display, touch screen, or some other type of user device. User interface 903 may be distributed among multiple user devices. Storage system 904 could include a disk, tape, integrated circuit, server, or some other memory device. Storage system 904 may be distributed among multiple memory devices.

Processing system 902 retrieves and executes software 905 from storage system 904. Software 905 may include an operating system, utilities, drivers, networking software, and other software typically loaded onto a computer system. Software 905 could include an application program, firmware, or some other form of machine-readable processing instructions. When executed by processing system 902, software 905 directs processing system 902 to operate as described herein to manage application streams in a network.

The various embodiments of the invention offer many advantages over the prior art. The various embodiments of the invention provide the full spectrum of ABR rates, each on-demand, to a client where a media gateway has minimal transcoder resources, thus optimizing the client's experience to changing network conditions. In a system that does not include any of the embodiments of the invention, the transcode session to deliver content to a client would need to be at the lowest rate to avoid buffering (and thus, poorest visual quality). Also, in a higher rate system that does not include any of the embodiments of the invention, the transcode session to deliver content to a client would exhibit buffering during congestion (and thus, a poor playback experience).

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Particular implementations of the subject matter described in this specification have been described. Other implementations are within the scope of the following claims. For example, the actions recited in the claims may be performed in a different order and still achieve desirable results. As one example, the processes depicted in the accompanying figures do not necessarily require the particular order shown, or sequential order, to achieve desirable results. In certain implementations, multitasking and parallel processing may be advantageous. Further, any methods described in this application may be implemented as computer software on a computer readable medium.

What is claimed is:

1. A method of operating a computing device with limited transcoding resources to represent a single media stream with different bit rates in a network to provide a full spectrum of available adaptive bitrate for the media stream by the computing device, the method comprising:
   producing, at a first computing device, a manifest file for a given media stream, the manifest file comprising a plurality of profiles for the given media stream that references two or more available bit rate variants of the given media stream that is available to be created by a transcoder unit of the first computing device, wherein each of the plurality of profiles includes i) a first available bit rate value of the given media stream and a URL associated with the given media stream and ii) a second bit rate value of the given media stream and the URL associated with the given media stream, wherein the produced manifest file is provided to a client computing device;
   in response to receiving a first request, for the given media stream, associated with one of the plurality of profiles, transcoding, at the first computing device, the given media stream at a first selected bit rate associated with the first request; and
   in response to receiving a second request, for the given media stream, associated with a new selected bit rate from one of the plurality of profiles, transcoding, at the first computing device, the given media stream at the new bit rate associated with the second request.

2. The method of claim 1, wherein the client computing device is configured to apply a dampening operation when switching presentation of the given media stream transcoded at the first selected bit rate to the given media stream transcoded at the new selected bit rate until the given media stream transcoded with the new bit rate is available.

3. The method of claim 1, wherein the first computing device is a media gateway.

4. The method of claim 1, wherein the transcoder unit comprises a single transcoder.

5. A method of claim 1, wherein the plurality of profiles of the manifest files reference a subset of all available bit rate variants that is available to be created by a transcoder unit of the first computing device.

6. The method of claim 5, wherein the subset of all available bit rate variants comprises a lowest bit rate and a second lowest bit rate.

7. The method of claim 5, wherein the subset of all available bit rate variants comprises a highest bit rate and a second highest bit rate.

8. The method of claim 5, wherein the subset of all available bit rate variants comprise a particular bit rate, the second bit rate value preceding the particular bit rate, and the third bit rate value following the particular bit rate.

9. A system of operating a computing device with limited transcoding resources to represent a single media stream with different bit rates in a network with a transcoder producing only one bit rate to provide a full spectrum of available adaptive bitrate for the media stream by the computing device, the system comprising:
   a media gateway, wherein the media gateway comprises a source and at least one transcoder;
   an origin server, wherein the origin server is communicatively coupled via a communication path to the media gateway and to at least one client; and, a client, wherein the client is located outside of a home network, and configured to receive content from the media gateway and the origin server;

wherein the transcoder comprises a processor configured to:

produce a manifest file for a given media stream, the manifest file comprising a plurality of profiles for the given media stream that references two or more available bit rate variants in a manifest file of the given media stream that is available to be created by the transcoder, wherein each of the plurality of profiles includes i) a first available bit rate value of the given media stream and a URL associated with the given media stream and ii) a second bit rate value of the given media stream and the URL associated with the given media stream, wherein the produced manifest file is provided to a client computing device;

in response to receiving a first request, for the given media stream, associated with one of the plurality of profiles, transcode the given media stream at a first selected bit rate associated with the first request; and in response to receiving a second request, for the given media stream, associated with a new selected bit rate from the one of the plurality of profiles, transcode the given media stream at the new bit rate associated with the second request.

10. The system of claim 9, wherein the transcoder is further configured to apply a dampening mechanism until the new bit rate is available.

11. The system of claim 9, wherein the media gateway is included within the home network.

12. The system of claim 9, wherein the origin server comprises a network core.

13. The method of claim 1, wherein the produced manifest file is transmitted to an intermediary computing device to be provided to the client computing device.

14. The method of claim 1, wherein the produced manifest file is transmitted to a video control to be provided to the client computing device.

15. The method of claim 1, comprising:

producing, at the first computing device, a second manifest file for the given media stream, the second manifest file comprising i) the second bit rate value of the given media stream and the URL associated with the given media stream and ii) a third bit rate value of the given media stream and the URL associated with the given media stream.

16. The method of claim 1, wherein the plurality of profiles of the manifest files reference all bit rate variants of the given media stream that is available to be created by a transcoder unit of the first computing device.

17. The method of claim 1, wherein the first bit rate value is greater than the second bit rate value, and the second bit rate value is greater than the third bit rate value.

18. The method of claim 1, wherein the first bit rate value is a lowest bit rate and the second bit rate value is a second lowest bit rate.

19. The method of claim 1, wherein the first bit rate value is a highest bit rate and the second bit rate value is a second highest bit rate.

20. A system with limited transcoding resources that is configured to represent a single media stream with different bit rates in a network to provide a full spectrum of available adaptive bitrate for the media stream, the system comprising:

a processor; and a memory having instructions stored thereon, wherein execution of the instructions, cause the processor to:

produce a manifest file for a given media stream, the manifest file comprising a plurality of profiles for the given media stream that references two or more available bit rate variants of the given media stream that is available to be created by a transcoder unit of the first computing device, wherein each of the plurality of profiles includes i) a first available bit rate value of the given media stream and a URL associated with the given media stream and ii) a second bit rate value of the given media stream and the URL associated with the given media stream, wherein the produced manifest file is provided to a client computing device;

in response to receiving a first request, for the given media stream, associated with one of the plurality of profiles, transcode the given media stream at a first selected bit rate associated with the first request; and in response to receiving a second request, for the given media stream, associated with a new selected bit rate from one of the plurality of profiles, transcode the given media stream at the new bit rate associated with the second request.

* * * * *